United States Patent [19]

Cristiano

[11] Patent Number: 4,771,802

[45] Date of Patent: Sep. 20, 1988

[54] DUMP VALVE

[75] Inventor: Sergio Cristiano, Casale Monferrato, Italy

[73] Assignee: Promosint & Contractors S.r.l., Italy

[21] Appl. No.: 57,389

[22] Filed: Jun. 2, 1987

[30] Foreign Application Priority Data

Jun. 3, 1986 [IT] Italy ................. 53486/86[U]

[51] Int. Cl.⁴ ............................................ F16K 11/044
[52] U.S. Cl. ................................................. 137/102
[58] Field of Search ............................... 137/102, 107

[56] References Cited

U.S. PATENT DOCUMENTS

| 3,451,415 | 6/1969 | Buford | 137/102 |
| 3,491,786 | 1/1970 | Crossman | 137/102 |
| 3,747,626 | 7/1973 | Valentino | 137/102 |
| 4,041,970 | 8/1977 | Peters | 137/102 |
| 4,579,138 | 4/1986 | Simoens | 137/102 |

FOREIGN PATENT DOCUMENTS 2522578  12/1975  Fed. Rep. of Germany ...... 137/102

*Primary Examiner*—Robert G. Nilson
*Attorney, Agent, or Firm*—Angelo Notaro

[57] ABSTRACT

A dump valve having a valve body provided with a closure piston plug for alternately closing a compressed gas feed aperture in a valve cover and a dump aperture connected to a user structure, the valve body also having a third aperture communicating with a compressed gas storage tank. Mainly to avoid gripping, the closure piston plug has the form of a hollow cylinder open at one end and slidably engaging a cylindrical guide member forming part of the valve cover and extending axially within the valve body.

9 Claims, 1 Drawing Sheet

DUMP VALVE

BACKGROUND OF THE INVENTION

This invention relates to a dump valve provided with a closure piston plug and an inner cylindrical guide member therefor.

Various types of air dump valves are known in which a closure piston plug alternately closes a dump aperture during feeding of compressed air into a storage tank and a feed aperture during dumping of the stored air from the tank toward a user structure.

Such valves have a multiplicity of applications. For example, they are used for dumping a tank or can be applied to an air ram to improve its speed of operation or finally they find an interesting application as compressed air guns for opening clogged silos, hoppers and ducts containing granular or powdery materials.

European Patent Application No. 134,726, filed June 7, 1984 and published Mar. 20, 1985, discloses an air dump valve in which a piston is guided for axial movement by a short peripheral flange engaging with ample clearance a cylindrical valve body.

Valves of this type may give rise to some drawbacks. For example, when they are mounted in the vicinity of a source of heat or when they are incidentally overheated by heat coming from the user structure, the piston may dilate until it grips by contact with the surrounding walls of the valve body. Also the very presense of clearance between the piston and the valve body may lead to a misaligned movement and a tendency of gripping. Further, in case of gripping, the replacement of the piston usually necessitates dismounting of the valve from the user structure, which is always disagreeable. Finally, it is to be noted that the provision of a relatively short piston mounted with clearance relative to the valve body may permit impurities or dust coming from the dump aperture to penetrate into the valve body by the return effect.

It is an object of the present invention to eliminate or reduce the aforementioned drawbacks by providing a dump valve that will afford greater security against gripping by thermal effects on the piston, is provided with guide means for the piston to prevent gripping by misalignment and, in case of gripping, will permit removal of the piston without having to dismount the valve from the user structure.

It is a further object of the present invention to provide a dump valve that can be used in plants or structures involving the user of granular or powdery materials, substantially without causing the return of such materials into the valve body.

SUMMARY OF THE INVENTION

These and other objects and advantages of the present invention, which will appear from the following description, are achieved according to the invention by a dump valve comprising a valve body provided with a closure piston plug adapted to alternately close a feed aperture for compressed gas, provided in the cover of the valve, and a dump aperture connected to a user structure. The valve body is further provided with a third aperture communicating with a storage tank for the compressed gas. The improvement over the prior art substantially consists in that the closure piston plug has the form of a hollow cylinder open at one end and slidably engaging a cylindrical guide member forming part of the valve cover and extending axially within the valve body.

DESCRIPTION OF PREFERRED EMBODIMENT

Figure 1:
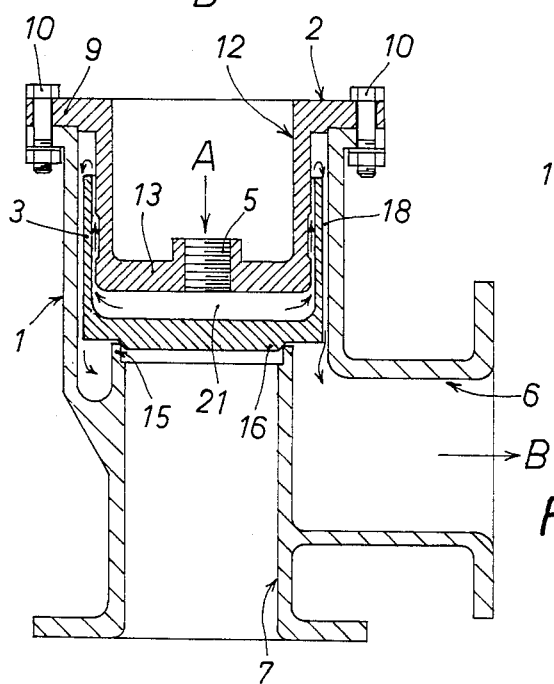

FIG. 1 shows an air dump valve substantially comprising a valve body 1, a cover 2 and a closure piston plug 3. The valve is provided with three apertures 5, 6 and 7 which respectively communicate with a compressed air feed line, a compressed air storage tank and a user structure, not shown. The peripheral portion of the cover 2 is formed with a flange 9 for removable connection to the associated portion of the valve body by bolts 10 and the inner portion of the cover 2 has the form of a cylinder 12 extending coaxially of the valve body 1. The feed aperture 5 is made in a bottom portion 13 of the cylindrical portion 12 which according to the invention serves as a guide member for the piston 3 which has the form of a hollow cylinder open upwardly for accurate sliding movement on the guide member 12, obtained by machining the mutually engaging surfaces.

Upwardly, i.e. toward the cover, the dump aperture 7 is defined by a valve seat 15 with sharp edges against which during the introduction of compressed air a frustoconical base portion 16 of the piston 3 abuts, as shown in FIG. 1. In other words, the valve seat and the base portion of the piston cooperating therewith have no complementary shape.

In the position of operation shown in FIG. 1, the dump aperture 7 is closed by the effect of the compressed air introduced into the valve in the direction of the arrow A through the feed aperture 5. This pressure of the air urges the piston, which is mounted for sliding movement on the guide member 12, to close the path of dumping. A gap 18 is formed between the cylindrical wall of the piston and the inner wall of the valve body so that the piston during its movement will not engage the valve body nor does the latter in any way contribute to guiding of the piston.

Referring to FIG. 1, the compressed air coming from the aperture 5 follows the tortuous path defined between the piston and the guide member 12 and then between the piston and the valve body to enter the tank in the direction of the arrow B. By interrupting the feed of compressed air and releasing to atmosphere the compressed air accumulated in a chamber 21 formed in this phase of operation between the cover 2 and the piston 3, the pressure accumulated in the tank causes the compressed air to be dumped in the direction of the arrow C by switching the valve to the position shown in FIG. 2. In other words, the piston is moved along the guide member in the opposite direction until it closes the feed aperture 5 and opens the dump aperture 7. This will produce immediate and complete dumping of the pressure accumulated in the tank toward the user structure in the direction of the arrow D, i.e. a "shot" adapted to violently shake, for example, a column of granular or powdery material for opening a clogged hopper, silo or the like.

Figure 3:
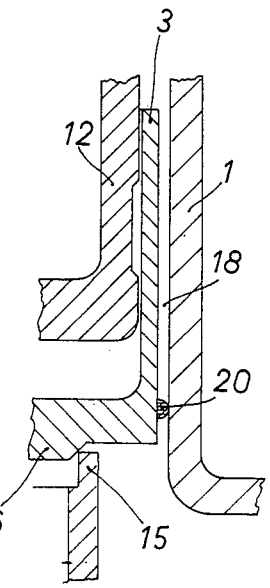
FIG. 3 is an axial sectional view, on a larger scale, of a modified detail of the dump valve shown in FIGS. 1 and 2.

FIG. 3 shows, on a larger scale, a detail of the valve according to the invention, wherein a dust guard gasket 20 is fitted on the piston 3 for further protection of the piston from dust or granular particles in case of particularly unfavorable applications. However, it is to be understood that the relatively great length of the piston in comparison with its diameter will produce rather a long and tortuous path of the air between the feed aperture 5 and the aperture 6 or 7. This is particularly advantageous for preventing or minimizing the introduction of dust particles in the direction toward the feed aperture in case there is a tendency for a return effect of dust from the user structure. Furthermore, the great length of the piston permits the piston to be better guided during its axial movement on the cylindrical portion 12 of the cover.

It will also be evident that a dilation, if any, of the piston, which would predominantly act in the radially outward direction, can be absorbed by the gap 18 without substantially impairing the possibility of movement of the piston on the guide member 12. Finally, it will be understood that the replacement, if any, of the piston 20 can be effected by simply dismounting the cover and guide member without disconnecting the valve from the user structure.

Figure 2:
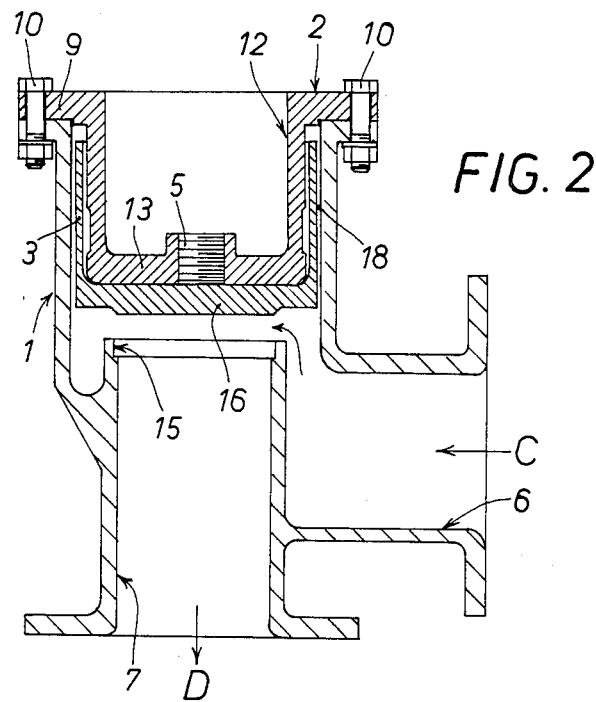
FIGS. 1 and 2 are axial sectional views of a dump valve according to the invention in two different positions of operation.

As shown in FIGS. 1 and 2, the dump aperture 7 is adjacent the aperture 6, and is of comparable cross-section.

With regard to the materials, metallic or otherwise, used in making the valve described above, it is to be noted that the piston 3 may be made of a softer material than the valve body and the cover so that the piston will be the only part subject to wear and designed to be replaced, if at all. Further, the only portion of the valve body that requires mechanical machining is the valve seat 15.

Although a preferred embodiment of the invention has thus been described in detail and illustrated in the accompanying drawings, it is to be understood that the invention is not limited to this precise embodiment and that numerous changes and modifications obvious to one skilled in the art may be made therein without departing from the scope of the invention as defined by the appended claims.

I claim:

1. In a dump valve having a valve body provided with a closure piston plug mounted for movement along a stroke for alternately closing a compressed gas feed aperture in a valve cover and a dump aperture connected to a user structure, said valve body being further provided with an aperture connected to a compressed gas storage tank, said dump aperture and said aperture connected to a compressed gas storage tank being adjacent each other and being of substantially comparable cross-section, the improvement comprising said closure piston plug being in the form of a hollow cylinder open at one end and having an inner surface non-sealingly slidably engaged and guided on an inner cylindrical guide member forming part of said guide cover and extending axially within said valve body, said closure piston plug being guided for its entire stroke only on said guide member and being spaced inwardly by a gap from said valve body to form a gap with said valve body for its entire stroke.

2. A dump valve as claimed in claim 1, wherein said dump aperture is provided with a valve seat formed as one piece with said valve body and having a form different from that of an associated portion of said closure piston plug received in said valve seat.

3. A dump valve as claimed in claim 2, wherein said valve seat is formed with sharp edges and said associated portion of said closure piston plug has a frustoconical shape.

4. A dump valve as claimed in claim 1, wherein a dust guard gasket is fitted on said closure piston plug for spanning said gap.

5. A dump valve comprising:
a valve body having a dump aperture for discharging compressed gas from a tank, said valve body defining an interior space and including a valve seat in said interior space around said dump aperture, said valve body including a compressed gas feed opening spaced from said dump aperture and a storage tank aperture for connecting a compressed gas storage tank to said valve body and being positioned adjacent said valve seat of said dump aperture and having a comparable cross-section to said dump aperture;
a valve cover covering said compressed gas feed opening of said valve body, said valve cover having a cylindrical guide member portion extending in said opening in axial alignment with and toward said dump aperture, said valve cover including a bottom portion closing one end of said guide member portion in said valve body interior space, and a compressed gas feed aperture extending through said bottom portion of said valve cover; and
a closure piston slidably mounted in said valve body for movement on a stroke into and out of engagement with said valve seat, said piston being in the form of a hollow cylinder, open at one end and having an interior which is non-sealingly and slidably guided on an outer surface of said guide member portion for the entire stroke of said piston, said hollow cylinder of said piston having an outer surface spaced inwardly by a gap from said valve body, said piston, including a base portion, closing an end of said hollow cylinder in said valve body opposite said open end thereof and forming a valve closing element for engagement against said valve seat for closing said valve seat.

6. A dump valve according to claim 5, wherein said valve seat is made as one piece with said valve body and has a sharp edge, said base portion having a frustoconical shape for engagement with said sharp edge to close said valve seat.

7. A dump valve according to claim 6, including a dust guard gasket engaged around an outer surface of said hollow cylinder and spanning said gap.

8. A dump valve according to claim 5, wherein said dump and compressed gas apertures are axially aligned with each other and said dump aperture extends substantially transversely to said storage tank aperture.

9. A dump valve according to claim 8, wherein said valve body includes a connecting flange extending outwardly from an open end of said compressed gas feed opening, said valve cover having a flange extending outwardly from said open end of said cylindrical portion of said valve cover and being fixed to and against said flange of said valve body.

* * * * *